United States Patent [19]

Jarosch et al.

[11] Patent Number: 5,216,892
[45] Date of Patent: Jun. 8, 1993

[54] COMPRESSOR CLUTCH CUT-OUT CONTROL IN AN AUTOMOTIVE AIR CONDITIONING SYSTEM

[75] Inventors: George W. Jarosch, Elk Grove; Peter J. Malone, Mount Prospect, both of Ill.

[73] Assignee: Eaton Corporation, Cleveland, Ohio

[21] Appl. No.: 838,513

[22] Filed: Feb. 19, 1992

[51] Int. Cl.$^5$ ............................................. F25B 49/00
[52] U.S. Cl. ......................................... 62/115; 62/150; 62/157; 62/228.3
[58] Field of Search .................... 62/228.1, 228.3, 226, 62/227, 231, 234, 157, 158, 150, 154, 155, 156, 115, 243, 323.4

[56] References Cited

U.S. PATENT DOCUMENTS

| | | | |
|---|---|---|---|
| 4,209,994 | 7/1980 | Mueller et al. | 62/155 |
| 4,302,947 | 12/1981 | Mueller et al. | 62/156 |
| 4,835,976 | 6/1989 | Torrence | 62/115 |
| 4,848,100 | 7/1989 | Barthel et al. | 62/212 |
| 4,856,293 | 8/1989 | Takahashi | 62/228.3 |
| 4,944,160 | 7/1990 | Malone et al. | 62/180 |
| 4,993,231 | 2/1991 | Torrence et al. | 62/115 |

Primary Examiner—Harry B. Tanner
Attorney, Agent, or Firm—R. A. Johnston

[57] ABSTRACT

An automotive air conditioning system utilizing an electrically operated refrigerant expansion valve controlled by a micro-computer. The compressor clutch cut-off is controlled by a suction pressure sensor at high thermal load. At partial flow conditions of the expansion valve, representative of moderate evaporator thermal loading, the micro-computer controls compressor clutch "ON" time from an accumulated count incremented by a predetermined amount according to suction pressure change. When the accumulated count over successive signal sampling intervals reaches a predetermined maximum the clutch is cut-out based on the count which is representative of a predetermined time interval.

3 Claims, 2 Drawing Sheets

COMPRESSOR CLUTCH CUT-OUT CONTROL IN AN AUTOMOTIVE AIR CONDITIONING SYSTEM

BACKGROUND OF THE INVENTION

The present invention relates to refrigeration systems and particularly refrigeration systems employed for air conditioning or climate control of the passenger compartment of an automotive vehicle. Automotive air conditioning systems typically employ an evaporator with a flow of blower air discharged over the evaporator into the passenger compartment for cooling. Refrigerant flow to the evaporator is through an expansion device or valve and is typically controlled by cycling an electric clutch for engaging the drive to the compressor.

Various expansion means may be employed to supply the refrigerant to the evaporator at a reduced pressure from the condenser. One technique employs a simple capillary tube; the second technique employs an expansion means in the form of a mechanically operated thermal expansion valve having a diaphragm responsive to changes in pressure in a closed chamber filled with refrigerant which is exposed to the temperature of the refrigerant discharging from the evaporator such that changes in temperature produce a change in pressure acting on the diaphragm for controlling flow through the valve. A third type of expansion means comprises an electrically operated valve typically having a solenoid controlled by an electronic controller utilizing a microcomputer for either proportional movement or modulated pulse movement. All of these techniques are known; examples of vehicle air conditioning systems controlled by mechanical expansion valves are shown in U.S. Pat. No. 4,794,762, 4,841,734, and 4,944,160. Examples of automotive air conditioning systems controlled by electrically operated expansion valves are shown and described in U.S. Pat. No. 4,790,145, 4,835,976, 4,835,976, 4,848,100, and 4,873,836.

In such systems where an electrically operated expansion valve is employed for controlling refrigerant flow to the evaporator, it is known to sense the evaporator discharge or suction return pressure and to provide an electrical signal indicative thereof to an electronic controller for generating a signal to cut off the compressor clutch when the suction return pressure falls below a predetermined level. In systems of this latter type, when the thermal load on the evaporator is high, e.g., when the interior of the vehicle is very hot, it is desirable to run the evaporator as cold as possible to effect a maximum rate of cool down for the passenger compartment. Under such conditions, it is desired to maintain the compressor energized or operable on an uninterrupted basis so long as there is no likelihood of condensate freezing and ice formation on the exterior of the evaporator. Under conditions of high thermal load, it is undesirable to cycle the compressor "OFF" because of the attendant rise in blower discharge air over the evaporator which reduces the rate of cooling of the passenger compartment interior.

However, if the compressor is allowed to run continuously and the evaporator is maintained as cold as possible under conditions of moderate thermal loading, ice may form on the evaporator fins blocking off air flow, resulting in evaporator freeze-up. Thus, the compressor clutch must be cycled "OFF" before freeze-up occurs.

Heretofore, in air conditioning systems employing electrically operated expansion valves, the suction pressure sensor cycles the compressor clutch "OFF" when the evaporator discharge or suction pressure drops below a predetermined level.

However, it has been found that under maximum thermal loading conditions it is desirable to provide a lower evaporator discharge or suction pressure cut-out setting for the compressor clutch. Therefore, it has been desired to find some way or means of controlling the compressor clutch "ON" time from some criteria other than suction pressure in order to effect maximum cooldown under high thermal load conditions, yet to prevent evaporator freeze-up during moderate or low thermal load conditions.

SUMMARY OF THE INVENTION

The present invention provides an electronic controller employing a micro-computer which is programmed to override the normal compressor clutch cut-out control based upon evaporator discharge or suction pressure. The controller of the present invention is programmed to provide a maximum of compressor "ON" time which is varied dependent upon rapidly sampled values of the sensed suction pressure in accordance with a predetermined incrementing of the compressor clutch "ON" time. The time based control of the compressor clutch "ON" time is only enabled when the electric refrigerant valve is operating at less than a 25% open condition representing light thermal loading on the compressor. Under such light thermal load conditions, the accumulated "ON" time for the compressor clutch is incremented periodically until the accumulated time reaches a predetermined maximum and the compressor clutch is cycled "OFF". This prevents evaporator icing and freeze-up under moderate thermal load conditions.

DETAILED DESCRIPTION

Figure 1:
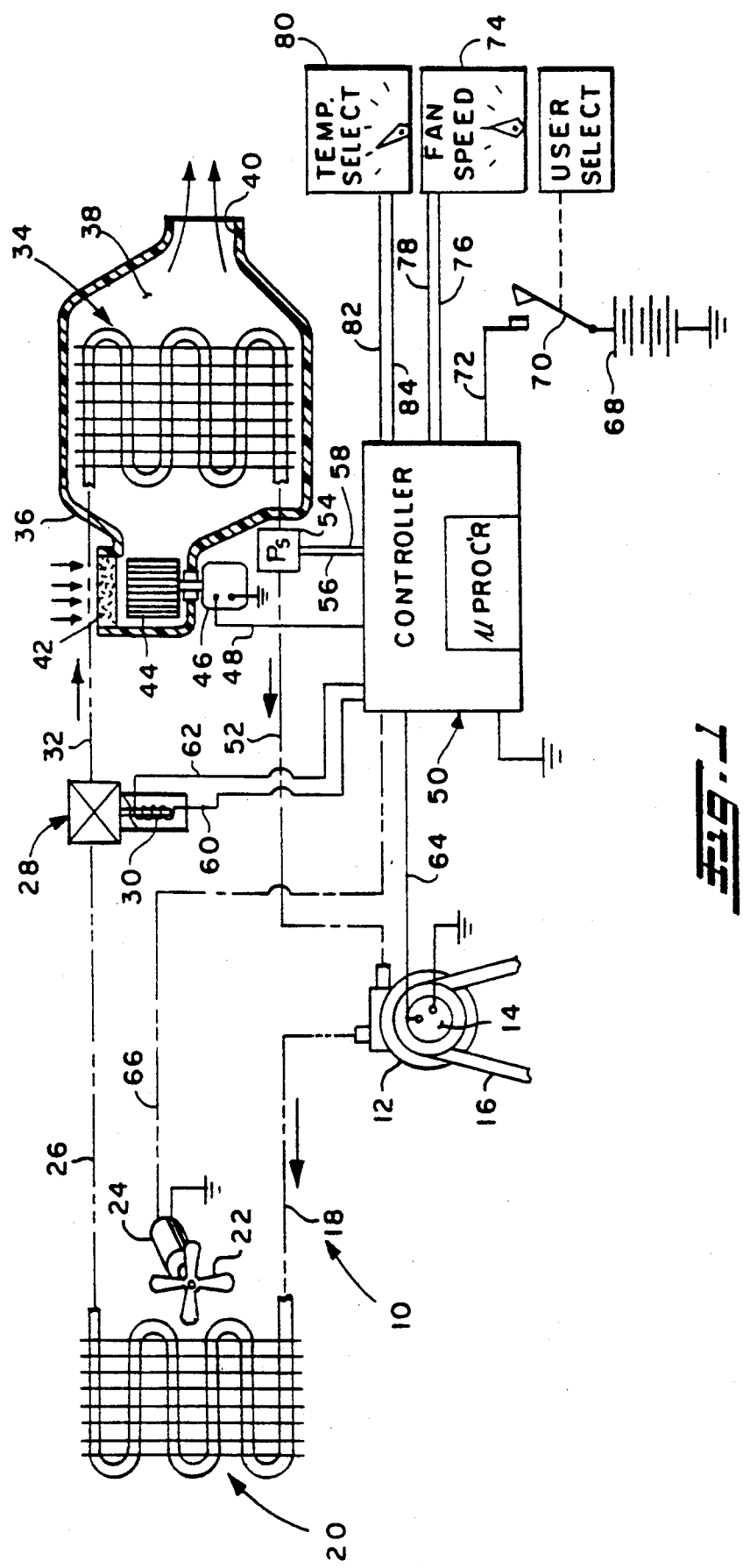
FIG. 1 is a schematic of the present invention as embodied in an automotive air conditioning system; and, FIG. 2 is a block flow diagram of the program for the controller of the system of FIG. 1.

Referring to FIG. 1, a refrigeration or air conditioning system is indicated generally at 10, and is illustrated as applied to automotive air conditioning having a compressor 12 connected to a source of power by an electrically operated clutch 14 driven by power transmission belt 16, which is typically connected to the engine crankshaft (not shown). Pressurized refrigerant from compressor 12 is discharged at relatively high pressure through conduit 18 to a condenser indicated generally at 20, which is typically cooled by ambient ram air as augmented at low speed by a fan 22 powered by a fan motor 24. Condensed refrigerant from condenser 20 is discharged through conduit 26 to the inlet of an electrically operated expansion valve indicated generally at 28 which is typically powered by a solenoid coil 30. The valve 28 discharges liquid refrigerant at a substantially reduced pressure along conduit 32 to the inlet of an evaporator indicated generally at 34. The evaporator is disposed in a blower housing 36 which has a plenum chamber 38 which discharges air through outlet 40 to the passenger compartment of a vehicle. The blower housing has a filtered air inlet 42 and a blower 44 disposed therein. Blower 44 is shaft-connected through the wall of blower housing 36 to a blower motor 46, which receives power along lead 48 from a controller, indicated generally at 50, with the opposite side of the motor grounded to the common vehicle ground.

The evaporator discharges superheated refrigerant along conduit 52, which is connected to the suction return or inlet of compressor 12. A pressure sensing switch 54 is disposed in the conduit 52 and senses the suction return pressure; and, switch 54 is connected via leads 56,58 to the controller 50.

Expansion valve 28 has the solenoid coil 30 thereof connected via leads 60,62 to receive a control signal, such as a pulse width modulated signal for a fractional duty cycle "ON" time, from the controller 50. The controller also provides power to the compressor clutch 14 along lead 64, with the other side of the clutch coil grounded. The controller also provides power to condenser fan motor 24 along lead 66; and, the other side of motor 24 is grounded. The controller is powered from the vehicle battery supply 68 by User Select switch 70 through power lead 72.

The evaporator blower fan motor 46 is controlled by user operated Fan Speed control 74 which is connected to the controller along lead 76,78. If desired, however, control 74 may operate fan 74 directly. A user Temperature Select control 80 so provides an input to the controller along leads 82,84.

The Temperature Select control is utilized, as is known in the art, to provide a user input to the system for the desired temperature of the passenger compartment.

Figure 2:
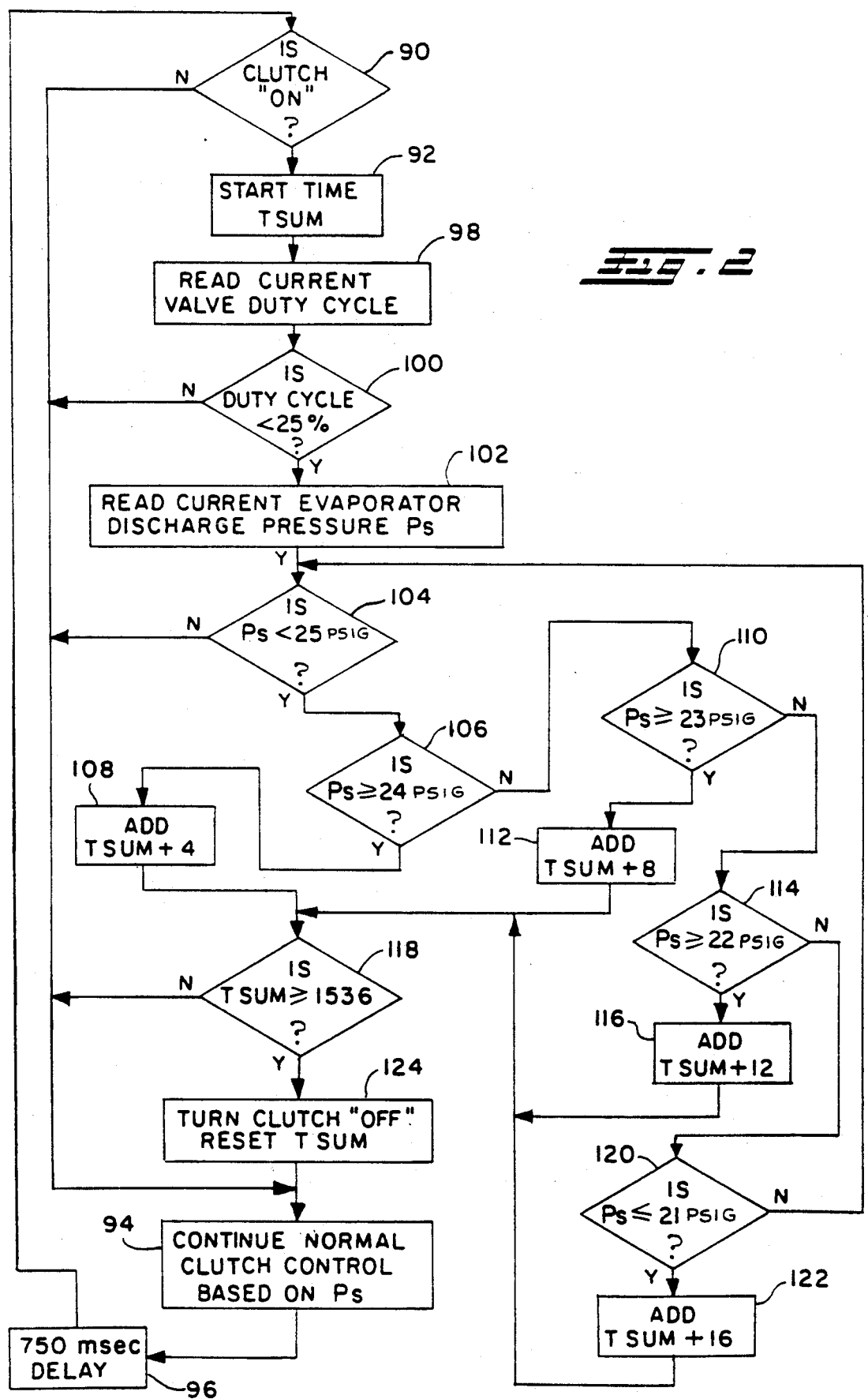

Referring to FIG. 2, the program for the microprocessor in controller 50 is shown in block flow diagram wherein at step 90 a determination is made whether the compressor clutch 12 is "ON". If this is the case the system proceeds to step 92 to start the time counter TSUM. If the compressor clutch is "OFF", that is not "ON", the controller proceeds to step 94 and continues normal clutch control based on the pressure switch 54. Typically, as known in the art of automotive air conditioning systems, the pressure switch turns the compressor "ON" at 35 psi (241 KPa) and "OFF" at 20 psi (138 KPa). After a 750 millisecond time delay at step 96, the system returns to step 90.

The system proceeds from step 92 to step 98, where the current value of the condition, e.g. the duty cycle of valve 28 is read, and the system proceeds to step 100 where a determination is made as to whether the valve condition is less than a predetermined condition associated with moderate thermal loading on the evaporator. In the presently preferred practise of the invention, for an electrically operated expansion valve 28, the level of 25% duty cycle has been determined to be satisfactory as an indication of light thermal loading for the evaporator.

If the determination is made at step 100 that the valve is operating to provide a refrigerant flow rate associated with a high thermal loading or greater than 25% duty cycle, the system proceeds directly to step 94. However, if the affirmative condition exists that the valve condition or duty cycle is less than 25%, the system proceeds to step 102 and reads the current value of the evaporator discharge or suction pressure denoted $P_s$. For operation in accordance with the program of FIG. 2, it will be understood that the controller 50 disregards pressure changes less than 1 psi (6.9 KPa). The controller then proceeds to step 104, where a determination is made as to whether the value of $P_s$ is less than an upper limit pressure. In the presently preferred practise, the threshold of determination or value of the suction pressure $P_s$ for this determination at step 104 has been chosen to be a level of 25 PSIG (172.5 KPa). If $P_s$ at step 104 is determined to be not less than 25 PSIG, the system proceeds directly to step 94; however, if the value of $P_s$ is less than 25 PSIG, the controller proceeds to step 106.

At step 106 a determination is made as to whether $P_s$ is equal to or greater than an increment less than the maximum, which in the presently preferred practise is a level of 24 PSIG (165.6 KPa) representing a 1 PSI decrement. If the value of $P_s$ at step 106 is equal or greater than 24 PSIG, the system proceeds to step 108 to add a value of 4 to the count of TSUM. If the value of $P_s$ at step 106 is not greater than or equal to 24 PSIG, the system proceeds to step 110 and makes a determination as to whether $P_s$ is equal to or greater than a second decremental value which in the presently preferred practise is 23 PSIG (158.7 KPa); and, if this is the case, the controller proceeds to step 112 to increment TSUM by an amount of 8 counts. However, if the determination at step 110 indicates that step $P_s$ is not equal to or greater than 23 PSIG, the system proceeds to step 114.

At step 114, a determination is made as to whether $P_s$ is equal to or greater than a third decremented value which in the presently preferred practise is 22 PSIG (151.8 KPa). If this is the case, the system then proceeds to step 116, where the value of TSUM is incremented by a value of 12 counts, and the system now proceeds to step 118. If the determination at step 114 is that $P_s$ is not greater than 22 PSIG, the system proceeds to step 120, where a determination is made as to whether $P_s$ is equal to or less than a fourth decremented value, which in the presently preferred practise is 21 PSIG (144.9 KPa). If the determination at step 120 is in the affirmative, the controller proceeds to step 122 and the value of TSUM is incremented by a value of 16 counts; and, the system proceeds to step 118. If the determination at step 120 is in the negative, the system proceeds to return to step 104.

At step 118, a determination is made as to whether the incremented value of TSUM is equal to or greater than a predetermined amount, which in the presently preferred practise is a count of 1536, which represents an elapsed time of at most 4.8 minutes. If the determination at step 118 is in the negative, the system returns to step 90. However, if the determination at step 118 is positive, the system proceeds to step 124, where the clutch is cycled "OFF" and TSUM is reset.

The system then proceeds to step 94 to continue normal clutch control based on the pressure sensor 54, which measures $P_s$. The system sampling rate is then injected by the delay at step 96.

In the presently preferred practise, the controller is set to allow a compressor "ON" time of 1.2 minutes, even though the pressure $P_s$ continuously at 21 PSIG (138 KPa). The controller is programmed for minimum compressor "ON" time of 7 seconds prevents undue rapid cycling of the compressor clutch.

The present invention thus intervenes to provide a time-based control of the compressor "ON" time when the refrigerant flow valve condition indicates moderate thermal loading of the system and when the suction pressure $P_s$ is less than 25 PSIG. When the suction pressure is less than 20 PSIG, the system ignores TSUM and is controlled by the pressure switch 54 and the requirement for a minimum "ON" time.

The invention has been described above with respect to an electrically operated valve 28, which is operated by pulse width modulation and the thermal loading is determined by measuring the current value of valve "OPEN" time as a percentage of the duty cycle. It will be understood, however, that other techniques for determining the valve condition as a representation of refrigerant flow may be employed, such as sensing the position of the movable valve member.

Although the invention has hereinabove been described with respect to the illustrated embodiments, it will be understood that the invention is capable of modification and variation, and is limited only by the following claims.

We claim:

1. A method of controlling refrigerant flow in a refrigeration system of the type having an energizable pump for circulating refrigerant through a condenser, an expansion valve, an evaporator and for return to the pump said method comprising:

(a) energizing said pump;
    (b) measuring the condition of said expansion valve; and, comparing same with a predetermined condition;
    (c) measuring the time elapsed since energization of said pump;
    (d) sensing the pressure of the refrigerant discharging from the evaporator and de-energizing said pump when said sensed pressure is below a desired level;
    (e) incrementing said elapsed time with predetermined amounts is based upon the value of said sensed pressure, and accumulating said incremental time;
    (f) repeating steps (b)–(e) periodically; and,
    (g) de-energizing said pump when said accumulated time reaches a predetermined level.

2. The method defined in claim 1, wherein said step of incrementing said elapsed time comprises adding four (4) counts for each 1 lb./inch$^2$ (6.9 KPa), said sensed pressure is less than said desired level.

3. The method defined in claim 1, wherein said step of determining the condition of said expansion valve includes determining the proportion of "ON" time of an electrically pulsed valve.

* * * * *